United States Patent
Hirai et al.

(10) Patent No.: US 8,454,914 B2
(45) Date of Patent: Jun. 4, 2013

(54) METHOD FOR RECOVERING RUTHENIUM

(75) Inventors: Yoshinari Hirai, Tokyo (JP); Tomohiro Maruko, Tokyo (JP); Kohei Seki, Niihama (JP)

(73) Assignees: Furuya Metal Co., Ltd., Tokyo (JP); Sumitomo Chemical Company, Limited, Tokyo (JP)

( * ) Notice: Subject to any disclaimer, the term of this patent is extended or adjusted under 35 U.S.C. 154(b) by 48 days.

(21) Appl. No.: 12/515,710

(22) PCT Filed: Nov. 20, 2007

(86) PCT No.: PCT/JP2007/072451
§ 371 (c)(1),
(2), (4) Date: May 20, 2009

(87) PCT Pub. No.: WO2008/062785
PCT Pub. Date: May 29, 2008

(65) Prior Publication Data
US 2010/0055011 A1  Mar. 4, 2010

(30) Foreign Application Priority Data
Nov. 21, 2006 (JP) .................. 2006-313886

(51) Int. Cl.
*C01G 55/00* (2006.01)
(52) U.S. Cl.
USPC .......................................... 423/22
(58) Field of Classification Search
USPC .......................................... 423/22
See application file for complete search history.

(56) References Cited

U.S. PATENT DOCUMENTS

| | | | | |
|---|---|---|---|---|
| 3,969,267 A | * | 7/1976 | McVicker | 502/36 |
| 4,132,569 A | * | 1/1979 | DePablo et al. | 134/3 |
| 4,558,030 A | * | 12/1985 | Arcuri et al. | 502/325 |
| 5,084,092 A | | 1/1992 | Campbell et al. | |
| 6,344,067 B1 | | 2/2002 | Craig et al. | |
| 7,115,239 B2 | * | 10/2006 | Forni et al. | 423/363 |
| 2002/0115554 A1 | * | 8/2002 | Zhou | 502/28 |

FOREIGN PATENT DOCUMENTS

| | | | |
|---|---|---|---|
| JP | 56-114835 A | | 9/1981 |
| JP | 58-194745 A | | 11/1983 |
| JP | 58194745 A | * | 11/1983 |
| JP | 59-97536 A | | 6/1984 |
| JP | 61-79736 A | | 4/1986 |
| JP | 64-70150 A | | 3/1989 |
| JP | 2-197532 A | | 8/1990 |
| JP | 02197532 A | * | 8/1990 |
| JP | 03088728 A | * | 4/1991 |
| JP | 2001-73043 A | | 3/2001 |
| JP | 2002-30363 A | | 1/2002 |
| JP | 2004-292912 A | | 10/2004 |

* cited by examiner

*Primary Examiner* — Melvin C Mayes
*Assistant Examiner* — Melissa Stalder
(74) *Attorney, Agent, or Firm* — Birch, Stewart, Kolasch & Birch, LLP

(57) ABSTRACT

An object of the present invention is to provide a process for recovering ruthenium at a sufficient recovery rate from a solid in which a ruthenium compound is supported on a carrier. The present invention relates to a process for recovering ruthenium, comprising the following steps (1) to (3): (1) bringing a solid in which a ruthenium compound is supported on a carrier, into contact with a reducing gas, to thereby reduce the ruthenium compound; (2) cooling the solid obtained in the step (1) to 250° C. or lower under an atmosphere of a non-oxidizing gas; and (3) mixing the solid obtained in the step (2) with an oxidizing solution, to thereby dissolve ruthenium in the solution.

6 Claims, No Drawings

METHOD FOR RECOVERING RUTHENIUM

TECHNICAL FIELD

The present application is filed, claiming the Paris Convention priority of Japanese Patent Application No. 2006-313886, the entire content of which is herein incorporated by reference.

The present invention relates to a process for recovering ruthenium from a solid in which a ruthenium compound is supported on a carrier.

BACKGROUND ART

The following method is known as one of the methods for recovering ruthenium from solids containing ruthenium compounds: that is, the method comprises the steps of bringing such a solid into contact with a reducing gas at a high temperature to thereby reduce the ruthenium compound to obtain a metallic ruthenium; mixing the resultant solid which contains the metallic ruthenium with an oxidizing solution to thereby oxidize the metallic ruthenium; and dissolving the resultant ruthenium oxide (cf. Patent Documents 1 and 2)

Patent Document 1: JP-A-58-194745/1983
Patent Document 2: JP-A-2-197532/1990

DISCLOSURE OF THE INVENTION

Problem to be Solved by the Invention

The above-described method is generally effective to achieve a sufficient recovery, in case where ruthenium is recovered from a solid which contains a bulk ruthenium compound. In case where ruthenium is recovered from a solid which contains a ruthenium compound in the form of fine particles for use as a catalyst or the like, particularly a solid in which a ruthenium compound is supported on a carrier, this method however is unstable in ruthenium recovery rate and tends to decrease the ruthenium recovery rate. An object of the present application is therefore to provide a process for recovering ruthenium from a solid in which a ruthenium compound is supported on a carrier, at a sufficient recovery rate.

Means for Solving the Problem

As a result of the present inventors' intensive studies, the decrease of the ruthenium recovery rate is found to be caused as follows: when a solid in which a ruthenium compound is supported on a carrier is brought into contact with a reducing gas at a high temperature and is then taken out to an atmospheric air while the solid still has a high temperature, a ruthenium oxide which is hard to be dissolved in an oxidizing solution is formed on the surface and inside of metallic ruthenium, and this ruthenium oxide is likely to cause the decrease of the recovery rate. As a result of the inventors' further studies, it is found that the above-described object of the present invention can be achieved by a process which comprises the steps of bringing the above-described solid into contact with a reducing gas, cooling the solid to a predetermined temperature or lower without any contact with an oxidizing gas such as an atmospheric air at a high temperature, and mixing the resultant solid with an oxidizing solution. The present invention is accomplished based on this finding.

That is, the present invention provides a process for recovering ruthenium, the process comprising the following steps (1) to (3):

(1) bringing a solid in which a ruthenium compound is supported on a carrier, into contact with a reducing gas, to thereby reduce the ruthenium compound;
(2) cooling the solid obtained in the step (1) to 250° C. or lower under an atmosphere of a non-oxidizing gas; and
(3) mixing the solid obtained in the step (2) with an oxidizing solution to thereby dissolve ruthenium in the solution.

EFFECT OF THE INVENTION

According to the present invention, ruthenium can be recovered at a sufficient recovery rate from a solid in which a ruthenium compound is supported on a carrier.

BEST MODES FOR CARRYING OUT THE INVENTION

Hereinafter, the present invention will be described in detail. The ruthenium-recovering process of the present invention comprises subjecting a solid in which a ruthenium compound is supported on a carrier, to a reducing step (1), a cooling step (2) and a dissolving step (3) in this order.

Examples of the ruthenium compound in the solid subjected to the reducing step (1) include halides such as $RuCl_3$ and $RuBr_3$, oxides such as $RuO_2$, $RuO(OH)_2$ and $Ru(OH)_4$, halogeno-acid salts such as $K_3RuCl_6$ and $K_2RuCl_6$, oxo-acid salts such as $K_2RuO_4$, oxy-halides such as $Ru_2OCl_4$, $Ru_2OCl_5$ and $Ru_2OCl_6$, halogeno complexes such as $K_2[RuCl_5(H_2O)_4]$, $[RuCl_2(H_2O)_4]Cl$, $K_2[Ru_2OCl_{10}]$ and $Cs_2[Ru_2OCl_4]$, ammine complexes such as $[Ru(NH_3)_5H_2O]Cl_2$, $[Ru(NH_3)_5Cl]Cl_2$, $[Ru(NH_3)_6]Cl_2$, $[Ru(NH_3)_6]Cl_3$ and $[Ru(NH_3)_6]Br_3$, carbonyl complexes such as $Ru(CO)_5$ and $Ru_3(CO)_{12}$, carboxylato complexes such as $[Ru_3O(OCOCH_3)_6(H_2O)_3]OCOCH_3$ and $[Ru_2(OCOR)_4]Cl$ (R=an alkyl group having 1 to 3 carbon atoms), nitrosyl complexes such as $K_2[RuCl_5(NO)]$, $[Ru(NH_3)_5(NO)]Cl_3$, $[Ru(OH)(NH_3)_4(NO)](NO_3)_2$ and $[Ru(NO)](NO_3)_3$, phosphine complexes, amine complexes, acetylacetonato complexes, etc. Two or more selected from those may be contained in the above-described solid. When the ruthenium compound is an oxide, the process of the present invention is particularly effective. The oxide of ruthenium may be a mixed oxide which contains ruthenium and other element. Further, a solid in which a ruthenium oxide is supported on a carrier may be an oxide obtained by oxidizing the surface of metallic ruthenium of a solid in which the metallic ruthenium is supported on a carrier, under an atmospheric air or the like.

As the carrier in the solid, a solid oxide is preferably used. Examples of such a solid oxide include alumina, silica, titania, zirconia, niobium oxide, chromium oxide, etc., and a mixture of two or more oxides selected therefrom or a mixed oxide. The process of the present invention is particularly effective, when the carrier contains rutile, anatase or brookite titania.

The carrier, i.e., the solid, has a shape of, for example, sphere, cylinder, triangular prism, quadratic prism, polygonal prism, ring, honeycomb or the like. As the method of forming the carrier, extrusion forming, tablet forming, spray forming or the like is exemplified, and the formed solid may be crushed into chips with suitable sizes, which then may be classified according to their sizes.

The above-described solid in which the ruthenium compound is supported on the carrier is brought into contact with a reducing gas to reduce the ruthenium compound on the carrier, so that the ruthenium compound is converted into metallic ruthenium. In this regard, the solid is crushed into particles before the contact with the reducing gas. By doing so, the recovery rate of ruthenium is easily improved. Otherwise, the solid is calcined at a temperature of from about 200 to about 700° C. under an atmosphere of an oxidizing gas such as an oxygen gas or an air, before the contact with the reducing gas. By doing so, the unnecessary organic content is removed, and the recovery rate of ruthenium is easily improved.

The reducing gas may be a gas containing, for example, hydrogen, carbon monoxide, hydrazine, methanol, ethanol, formaldehyde, hydroxylamine, formic acid or the like, and the gas optionally may contain two or more thereof. Any of these reducing materials may be diluted with an inert gas such nitrogen, helium or argon, or water vapor, so as to inhibit excessive heat generation during the reduction, so that sintering of metallic ruthenium can be prevented and so that an explosion limit concentration can be avoided. As the reducing gas, a gas containing hydrogen and/or carbon monoxide is preferably used, and a gas containing hydrogen is more preferably used.

The temperature for the reducing step (1) is usually from 200 to 1,000° C. When this reducing temperature is too low, undesirably, a time required to convert the ruthenium compound into metallic ruthenium becomes longer. On the other hand, when this temperature is too high, the carrier is likely to be reduced, which is undesirable because the carrier component is apt to be dissolved in the following dissolving step (3). Too high a reducing temperature is disadvantageous in view of cost and is likely to cause sintering of the metallic ruthenium, which undesirably makes it hard to dissolve the metallic ruthenium in the following dissolving step (3). Again, if the carrier contains titania, too high a reducing temperature allows the metallic ruthenium to be coated with the titania because of a solid-solid system chemical interaction between the metallic ruthenium and the titania [SMSI (Strong Metal Support Interaction) phenomenon], with an undesirable result that it becomes hard to dissolve the metallic ruthenium in the following dissolving step (3). Therefore, the reducing temperature is preferably from 250 to 700° C., more preferably from 250 to 550° C.

The solid in which the metallic ruthenium is supported on the carrier, obtained in the reducing step (1), is cooled to 250° C. or lower under an atmosphere of a non-oxidizing gas without any contact with an oxidizing gas at a temperature exceeding 250° C., in the cooling step (2). Thus, oxidation of the metallic ruthenium at its surface or inside can be prevented by cooling the above-described solid to a predetermined temperature or lower without any contact with an oxidizing gas at a high temperature. As a result, it becomes possible to prevent formation of ruthenium oxide which is hard to be dissolved in an oxidizing solution in the following dissolving step (3). This effect leads to improvement of the recovery rate of ruthenium.

The non-oxidizing gas is a gas which contains substantially no component capable of oxidizing the metallic ruthenium, such as oxygen. The non-oxidizing gas, for example, may be a reducing gas such as hydrogen, or an inert gas such as nitrogen, helium or argon, or a gas mixture thereof. Above all, a gas containing hydrogen and/or nitrogen is preferably used.

When the reducing temperature for the reducing step (1) exceeds 250° C., the atmosphere of the reducing gas used in the reducing step (1) may be used as it is, or may be displaced with an inert gas, and then, the solid may be cooled to 250° C. or lower, preferably 150° C. or lower. When the reducing temperature for the reducing step (1) is not higher than 250° C., the atmosphere of the reducing gas used in the reducing step (1) may be used as it is, or may be displaced with an inert gas, and then, the solid may be cooled to a temperature lower than the reducing temperature, preferably 150° C. or lower. The solid cooled to a predetermined temperature or lower under an atmosphere of such a non-oxidizing gas may be taken out to an atmospheric air which is a conventional work environment.

The solid in which the metallic ruthenium is supported on the carrier, cooled in the cooling step (2), is mixed with an oxidizing solution in the dissolving step (3) to thereby oxidize the metallic ruthenium and dissolve the metallic ruthenium in the solution. As the oxidizing solution, there is used a solution, preferably an aqueous solution, which contains at least one compound which exhibits an oxidizing action on metallic ruthenium, selected from chloric acids such as hypochlorous acid, chlorous acid, chloric acid and perchloric acid, and alkali metal salts with these chloric acids; chlorine; hydrogen peroxide; and potassium permanganate. This solution may be controlled in its pH with a base such alkali hydroxide or an acid such as hydrochloric acid, nitric acid or sulfuric acid. Again, as the oxidizing solution, there may be used an aqua regia, and this aqua regia may contain oxygen.

As the oxidizing solution, there is used preferably a solution containing a chloric acid or an alkali metal salt therewith, more preferably a solution containing sodium hypochlorite. Typically, there is used a mixture solution of alkali chlorate and alkali hydroxide, particularly a mixture solution of sodium hypochlorite and sodium hydroxide.

The temperature for the dissolving step (3) is usually from 0 to 100° C., preferably from 50 to 100° C. Too low a dissolving temperature slows down the oxidation and dissolution of the metallic ruthenium, which is disadvantageous in view of practical use. On the other hand, too high a dissolving temperature is disadvantageous in view of cost. The dissolution may be efficiently carried out by rotating a dissolution tank or stirring as required.

In the dissolving step (3), there is usually obtained a slurry which comprises a suspension of the carrier in the solution in which ruthenium is oxidized and dissolved. The carrier is removed from this slurry by filtration or decantation to obtain a solution of the recovered ruthenium. Chlorine is blown into the solution of the recovered ruthenium thus obtained, to thereby oxidize and volatilize ruthenium, according the conventional method described in, for example, Patent Document 1; and the resultant volatilized ruthenium is absorbed into hydrochloric acid to recover ruthenium chloride. This ruthenium chloride is reduced with hydrogen or the like to recover metallic ruthenium.

As is understood from the foregoing description, preferred embodiments of the present invention include the following.

[1] A process for recovering ruthenium, comprising the following steps (1) to (3):
(1) bringing a solid in which a ruthenium compound is supported on a carrier, into contact with a reducing gas, to thereby reduce the ruthenium compound;
(2) cooling the solid obtained in the step (1) to 250° C. or lower under an atmosphere of a non-oxidizing gas; and
(3) mixing the solid obtained in the step (2) with an oxidizing solution to thereby dissolve ruthenium in the oxidizing solution.

[2] The process of the item [1], wherein the carrier in the step (1) contains titania.

[3] The process of the item [1] or [2], wherein the reducing gas used in the step (1) contains hydrogen.

[4] The process of any one of the items [1] to [3], wherein the reduction in the step (1) is carried out at a temperature of from 250 to 700° C.

[5] The process of any one of the items [1] to [4], wherein the non-oxidizing gas used in the step (2) contains hydrogen and/or nitrogen.

[6] The process of any one of the items [1] to [5], wherein the cooling in the step (2) is carried out at 150° C. or lower.

[7] The process of any one of the items [1] to [6], wherein the oxidizing solution used in the step (3) contains a compound selected from the group consisting of hypochlorous acid, chlorous acid, chloric acid, perchloric acid, and alkali metal salts with these chloric acids.

EXAMPLES

Hereinafter, Examples of the present invention are illustrated, which, however, should not be construed as limiting the scope of the present invention in any way.

Examples 1 to 6 and Comparative Examples 1 and 2

A solid (containing 3.2% by weight of ruthenium) in which ruthenium oxide was supported on a cylindrical titania/alumina mixture carrier was crushed into solid particles with sizes of 150 μm or less. The resulting solid particles were maintained at a temperature indicated in Table 1 for one hour in an air in an electric muffle furnace, for calcining thereof in the air, and were then cooled; and the calcined solid particles were removed from the furnace. The calcined solid particles were reduced in a tubular container under a stream of a hydrogen gas while the temperature being maintained at a temperature shown in Table 1 for one hour. The reduced solid particles were then cooled under a hydrogen gas atmosphere, and the hydrogen gas was then displaced with a nitrogen gas, and the solid particles of a temperature shown in Table 1 were removed from the container. To the reduced solid particles (10 g), a mixture solution (30 ml) of an aqueous sodium hypochlorite solution with an active chlorine concentration of 12.5% by weight (26.7 ml) and an aqueous sodium hydroxide solution with a concentration of 25% by weight (3.3 ml) was added. The resulting mixture was maintained at 70° C. for one hour under stirring. The mixture was then cooled and filtered. The ruthenium content in the mixture solution as the filtrate was measured by an inductive coupling high frequency plasma (ICP) spectroscopy, and the amount of the residual ruthenium on the titania/alumina mixture carrier as the residue was measured by a fluorescent X-ray analysis. A ratio of the ruthenium content in the mixture solution to the total of the ruthenium content and the amount of the residual ruthenium was calculated as a recovery rate of ruthenium. The results are shown in Table 1.

TABLE 1

| | Calcining temp. in air (° C.) | Reducing temp. with hydrogen (° C.) | Removing temp. (° C.) | Ruthenium recovery rate (%) |
|---|---|---|---|---|
| Ex. 1 | 200 | 450 | 100 | 80.1 |
| Ex. 2 | 200 | 450 | 119 | 79.4 |
| Ex. 3 | 200 | 250 | 122 | 75.5 |
| Ex. 4 | 200 | 550 | 106 | 80.3 |
| Ex. 5 | 300 | 450 | 92 | 84.0 |
| Ex. 6 | 300 | 450 | 117 | 75.5 |
| C. Ex. 1 | 200 | 450 | 300 | 18.3 |
| C. Ex. 2 | 650 | 650 | 260 | 35.0 |

As is apparent from the above-described results, it is found that ruthenium could be recovered at a sufficient recovery rate, from the solids in which the ruthenium compounds were supported on the carriers, by the process of the present invention (Examples 1 to 6). In contrast, sufficient recovery rate of ruthenium could not be obtained, when the solids were not cooled to the predetermined temperature or lower under the atmosphere of the non-oxidizing gas, differently from the process of the present invention (Comparative Examples 1 and 2).

The invention claimed is:

1. A process for recovering ruthenium, comprising the following steps (1) to (5):
   (1) crushing a solid in which a ruthenium compound is supported on a carrier containing rutile, anatase or brookite titania into solid particles with sizes of 150 μm or less;
   (2) calcining the solid particles at a temperature of from about 200° C. to about 700° C. under an atmosphere of an oxidizing gas;
   (3) bringing the solid into contact with a reducing gas, to thereby reduce the ruthenium compound;
   (4) cooling the solid obtained in the step (3) to 250° C. or lower under an atmosphere of a non-oxidizing gas which contains hydrogen; and
   (5) mixing the solid obtained in the step (4) with an oxidizing solution, to thereby dissolve ruthenium in the solution.

2. The process of claim 1, wherein the reducing gas used in the step (3) contains hydrogen.

3. The process of claim 1, wherein the reduction in the step (3) is carried out at a temperature of from 250 to 700° C.

4. The process of any one of claim 1, wherein the cooling in the step (4) is carried out at 150° C. or lower.

5. The process of claim 1, wherein the oxidizing solution used in the step (5) contains a compound selected from the group consisting of hypochlorous acid, chlorous acid, chloric acid, perchloric acid, and alkali metal salts with these chloric acids.

6. A process for recovering ruthenium, comprising the following steps (1) to (6):
   (1) crushing a solid in which a ruthenium compound is supported on a carrier containing rutile, anatase or brookite titania into solid particles with sizes of 150 μm or less;
   (2) calcining the solid particles at a temperature of from 200 to 700° C. under an atmosphere of an oxidizing gas;
   (3) bringing the solid into contact with a reducing gas, to thereby reduce the ruthenium compound;
   (4) cooling the solid obtained in the step (3) to 250° C. or lower under an atmosphere of a non-oxidizing gas which contains hydrogen;
   (5) displacing the non-oxidizing gas containing hydrogen with nitrogen gas, and then taking out the solid; and
   (6) mixing the solid obtained in the step (5) with an oxidizing solution, to thereby dissolve ruthenium in the solution.

\* \* \* \* \*